United States Patent
Strunk et al.

(10) Patent No.: US 7,275,362 B2
(45) Date of Patent: Oct. 2, 2007

(54) THRUST REVERSERS INCLUDING LATCHING MECHANISMS AND METHODS FOR MANUFACTURING SUCH THRUST REVERSERS

(75) Inventors: John T. Strunk, Seattle, WA (US); Bruce Gabel, Wichita, KS (US)

(73) Assignee: The Boeing Company, Chicago, IL (US)

( * ) Notice: Subject to any disclaimer, the term of this patent is extended or adjusted under 35 U.S.C. 154(b) by 268 days.

(21) Appl. No.: 10/936,418

(22) Filed: Sep. 8, 2004

(65) Prior Publication Data

US 2006/0059886 A1    Mar. 23, 2006

(51) Int. Cl.
    *F02K 1/54*    (2006.01)
(52) U.S. Cl. .................. 60/226.2; 60/796; 244/110 B; 29/889.2
(58) Field of Classification Search .............. 60/226.2, 60/796, 797, 798, 204; 244/110 B, 129.4, 244/129.5, 53 B; 29/889.2, 889.22
    See application file for complete search history.

(56) References Cited

U.S. PATENT DOCUMENTS

| | | | |
|---|---|---|---|
| 3,600,023 A | | 8/1971 | Gudde |
| 3,762,667 A | | 10/1973 | Pender |
| 4,044,973 A | | 8/1977 | Moorehead |
| 4,283,028 A | | 8/1981 | Wilke |
| 4,286,727 A | | 9/1981 | Limoncelli |
| 4,365,775 A | * | 12/1982 | Glancy ...................... 244/53 R |
| 4,549,708 A | * | 10/1985 | Norris ...................... 244/129.4 |
| 4,557,441 A | * | 12/1985 | Aspinall ................... 244/129.4 |
| 4,585,189 A | | 4/1986 | Buxton |
| 4,629,146 A | | 12/1986 | Lymons |
| 4,679,750 A | * | 7/1987 | Burhans .................. 244/129.4 |
| 4,683,717 A | * | 8/1987 | Naud ........................ 60/226.1 |
| 5,076,514 A | * | 12/1991 | Melcher ................... 244/129.4 |
| 5,083,426 A | | 1/1992 | Layland |
| 5,112,242 A | | 5/1992 | Choy |
| 5,239,822 A | | 8/1993 | Buchacher |
| 5,307,623 A | | 5/1994 | Antuna |
| 5,369,954 A | | 12/1994 | Stuart |
| 5,706,651 A | | 1/1998 | Lillibridge |
| 5,791,138 A | | 8/1998 | Lillibridge |
| 5,904,041 A | * | 5/1999 | Dhainault .................. 60/226.2 |
| 5,915,765 A | * | 6/1999 | Sternberger ............ 292/256.69 |
| 5,943,856 A | | 8/1999 | Lillibridge |
| 6,032,901 A | | 3/2000 | Carimali |

(Continued)

FOREIGN PATENT DOCUMENTS

EP          0926333          6/1999

(Continued)

*Primary Examiner*—Ted Kim
(74) *Attorney, Agent, or Firm*—Perkins Coie LLP (57) ABSTRACT

Thrust reversers having latching mechanisms and methods for manufacturing such thrust reversers are disclosed herein. An aircraft system in accordance with one embodiment includes a thrust reverser having a first inner panel and a second inner panel opposite the first inner panel. The first and second inner panels have an inner surface and an upper portion. The system further includes a catch projecting inwardly from the inner surface and the upper portion of the first inner panel, and a latch projecting inwardly from the inner surface and the upper portion of the second inner panel. The latch is positioned to selectively interlock with the catch to inhibit relative movement between the first and second inner panels.

36 Claims, 8 Drawing Sheets

U.S. PATENT DOCUMENTS

| | | |
|---|---|---|
| 6,036,238 A | 3/2000 | Lallament |
| 6,059,231 A * | 5/2000 | Dessenberger, Jr. ...... 244/129.5 |
| 6,189,832 B1 | 2/2001 | Jackson |
| 6,220,546 B1 * | 4/2001 | Klamka et al. .......... 244/129.4 |
| 6,227,485 B1 * | 5/2001 | Porte ........................... 244/54 |
| 6,340,135 B1 | 1/2002 | Barton |
| 6,517,027 B1 | 2/2003 | Abruzzese |
| 2007/0084964 A1 * | 4/2007 | Sternberger ............... 244/53 R |

FOREIGN PATENT DOCUMENTS

FR          2711187    *    4/1995

* cited by examiner

THRUST REVERSERS INCLUDING LATCHING MECHANISMS AND METHODS FOR MANUFACTURING SUCH THRUST REVERSERS

TECHNICAL FIELD

The present invention is related to thrust reversers having latching mechanisms and methods for manufacturing such thrust reversers.

BACKGROUND

Jet aircraft include nacelles for housing the engines and coupling the engines to the wings. The nacelles are contoured to reduce aerodynamic drag during operation of the aircraft. Conventional nacelles include a pair of thrust reverser cowlings that form a clam-shaped structure which wraps around the aircraft engine. During aircraft operation, the thrust reverser cowlings must be capable of withstanding considerable hoop loads caused by the high pressure of the jet exhaust stream flowing therein.

Conventional thrust reverser cowlings are pivotably coupled to a pylon at the upper portion of the nacelle. The thrust reverser cowlings can accordingly be pivoted upward to access the engine for maintenance and/or repair. During aircraft operation, the thrust reverser cowlings are closed and their distal ends are positioned proximate to each other at the lower portion of the nacelle. The distal ends of the thrust reverser cowlings can include a latching mechanism for locking the cowlings together during engine operation.

One drawback of conventional thrust reverser cowlings is that the inner walls may not be sufficiently stiff to prevent significant deflection when used with high-thrust engines. For example, during a rejected take-off, a high-thrust engine places an increased load on the blocker doors of the thrust reverser, which may cause the inner walls to deflect. Significant deflection in the inner walls of the thrust reverser changes the load path between the engine and the thrust reverser, which can damage components in the engine and thrust reverser. Due to space constraints in certain applications, it may not be possible to increase the thickness of the inner walls to preclude significant deflection. Accordingly, there is a need to increase the stiffness of the inner walls of the thrust reverser.

SUMMARY

Several aspects of the invention are directed to thrust reversers having latching mechanisms and methods for manufacturing such thrust reversers. An aircraft system in accordance with one embodiment includes a thrust reverser having a first inner panel and a second inner panel opposite the first inner panel. The first and second inner panels have an inner surface and an upper portion. The system further includes a catch projecting inwardly from the inner surface and the upper portion of the first inner panel, and a latch projecting inwardly from the inner surface and the upper portion of the second inner panel. The latch is positioned to selectively interlock with the catch to inhibit relative movement between the first and second inner panels.

In another embodiment, an aircraft system includes a support member and a thrust reverser having a first inner wall and a second inner wall opposite the first inner wall. The first and second inner walls each have an inner surface and an upper portion pivotably attached to the support member. The system further includes a catch projecting inwardly from the inner surface of the upper portion of the first inner wall, and a latch projecting inwardly from the inner surface of the upper portion of the second inner wall. The catch has an opening, and the latch includes an engagement member movable between (a) a lock position in which the engagement member is partially received in the opening of the catch to inhibit the first and second inner walls from pivoting relative to the support member, and (b) a release position in which the engagement member is external to the opening of the catch.

In another embodiment, an aircraft system includes a thrust reverser having first and second inner panels each movable between an open position and a closed position. The first and second inner panels have an inner surface and a forward portion. The system further includes a catch projecting inwardly from the inner surface of the forward portion of the first inner panel, and a remotely-actuated latch projecting inwardly from the inner surface of the forward portion of the second inner panel. The latch includes (a) an engagement member for selectively engaging the catch to retain the first and second inner panels in the closed position, and (b) a driving mechanism for moving the engagement member.

Another aspect of the invention is directed to methods for manufacturing a thrust reverser on an aircraft. The thrust reverser has a first inner panel and a second inner panel. In one embodiment, a method includes coupling a catch to an inner surface of an upper portion of the first inner panel, and attaching a latch to an inner surface of an upper portion of the second inner panel such that the latch is positioned to selectively interlock with the catch to inhibit relative movement between the first and second inner panels.

DETAILED DESCRIPTION

The following disclosure describes thrust reversers having latching mechanisms and methods for manufacturing such thrust reversers. Certain details are set forth in the following description and in FIGS. 1-9 to provide a thorough understanding of various embodiments of the invention. Other details describing well-known structures and systems often associated with thrust reversers are not set forth in the following disclosure to avoid unnecessarily obscuring the description of various embodiments of the invention.

Many of the details, dimensions, angles, and other features shown in the figures are merely illustrative of particular embodiments of the invention. Accordingly, other embodiments can have other details, dimensions, and/or features without departing from the spirit or scope of the present invention. In addition, further embodiments of the invention may be practiced without several of the details described below, or various aspects of any of the embodiments described below can be combined in different combinations.

A. Embodiments of Thrust Reversers Having Latching Mechanisms

Figure 1:
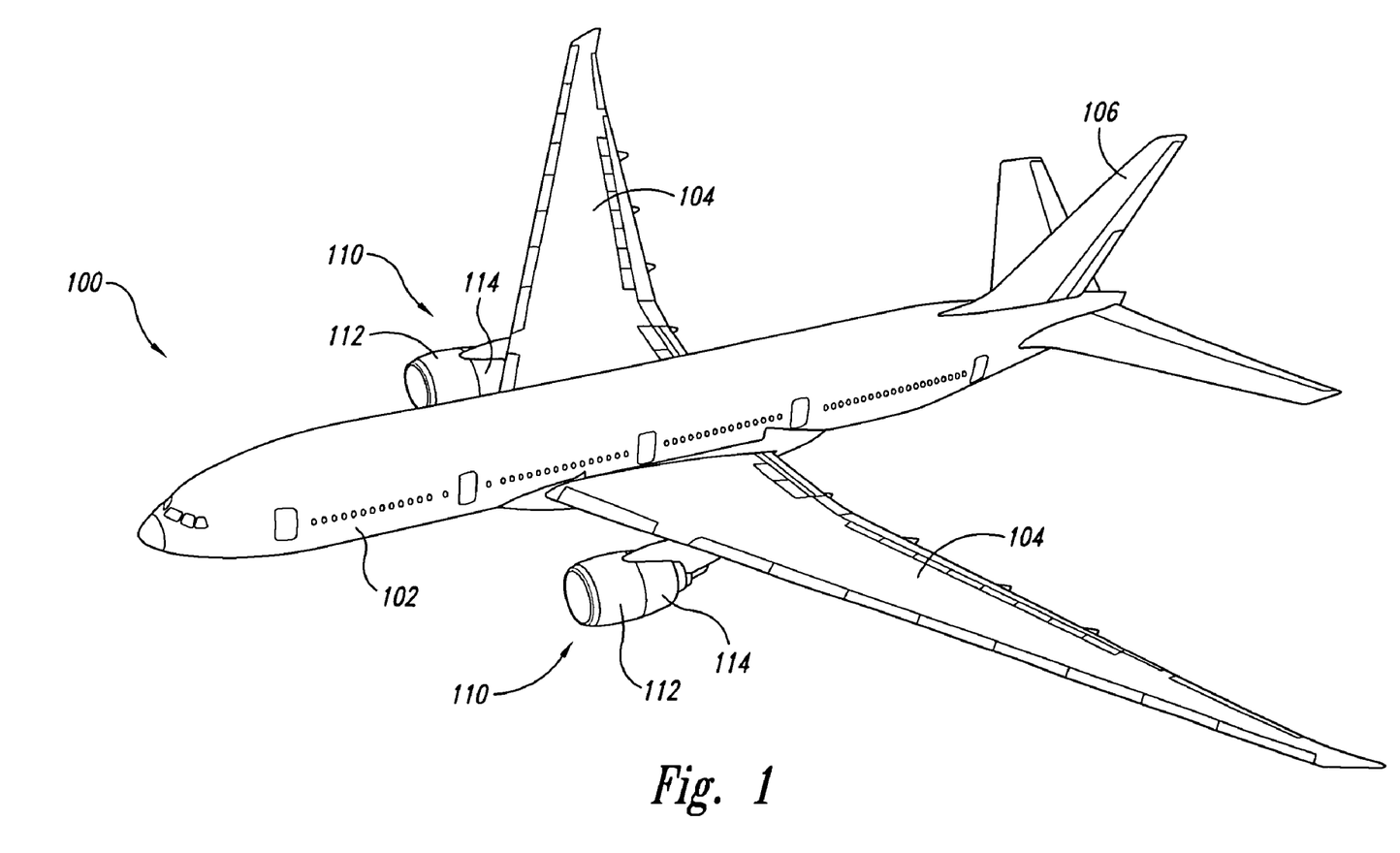
FIG. 1 is a schematic isometric view of an aircraft having a plurality of power plants in accordance with one embodiment of the invention.

FIG. 1 is a schematic isometric view of an aircraft 100 having a plurality of power plants 110 in accordance with one embodiment of the invention. The aircraft 100 further includes a fuselage 102, a plurality of wings 104 attached to the fuselage 102, and a tail 106 attached to the fuselage 102. In the illustrated embodiment, the power plants 110 are mounted to corresponding wings 104; however, in other embodiments, the power plants 110 can be coupled to the fuselage 102 and/or the tail 106. The individual power plants 110 include a jet engine 112 and a thrust reverser 114.

Figure 2:
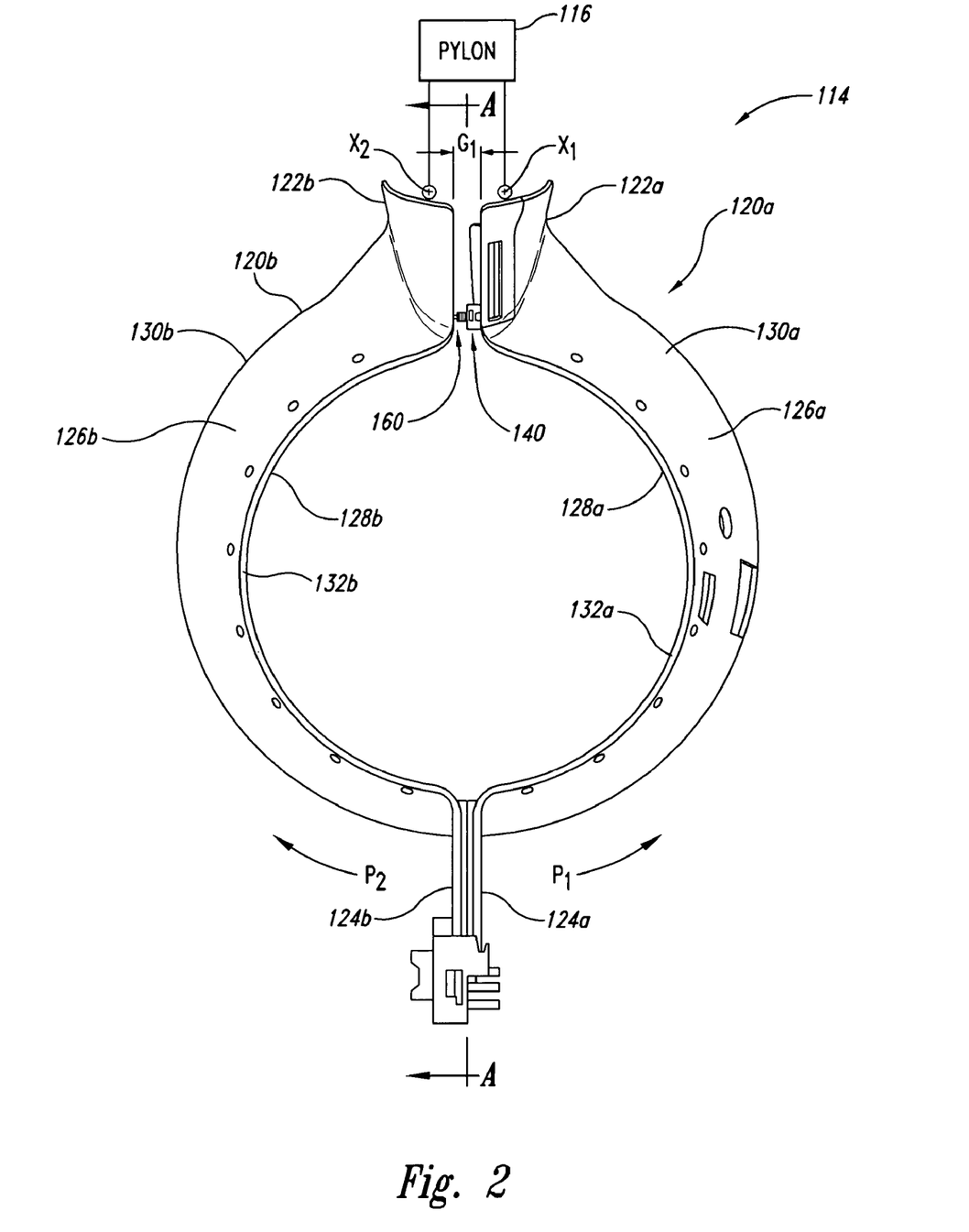
FIG. 2 is a schematic front view of several components of a thrust reverser in accordance with one embodiment of the invention.

FIG. 2 is a schematic front view of several components of the thrust reverser 114 in accordance with one embodiment of the invention. The illustrated thrust reverser 114 includes a first inner panel 120a, a second inner panel 120b opposite the first panel 120a, a catch 140 attached to the first panel 120a, and a latch 160 attached to the second panel 120b. The latch 160 selectively interlocks with the catch 140 to (a) inhibit the first and second inner panels 120a-b from moving relative to each other, and (b) increase the stiffness of the first and second panels 120a-b during operation. The thrust reverser 114 can also have a translating sleeve (not shown) that moves to redirect the gas flow during operation. Alternatively, the thrust reverser 114 can have other configurations.

The individual first and second inner panels 120a-b include an upper portion 122a-b, a lower portion 124a-b, and an arcuate portion 126a-b between the upper and lower portions 122a-b and 124a-b. The arcuate portions 126a-b of the first and second panels 120a-b form a barrel through which engine gases pass during operation. The individual first and second inner panels 120a-b further include an inner surface 128a-b, an outer surface 130a-b opposite the inner surface 128a-b, a forward edge 132a-b, and an aft edge (not shown) opposite the forward edge 132a-b. In one aspect of the illustrated embodiment, the upper portions 122a-b of the first and second inner panels 120a-b are spaced apart by a gap $G_1$ and pivotably coupled to a pylon 116 (shown schematically) or other support member. As such, the first inner panel 120a can pivot in a direction $P_1$ about a first pivot point $X_1$ from a closed position (shown in FIG. 2) to an open position (not shown), and the second inner panel 120b can pivot in a direction $P_2$ about a second pivot point $X_2$ from a closed position (shown in FIG. 2) to an open position (not shown). The first and second inner panels 120a-b are closed during aircraft operation and can be opened for maintenance or repair of the engine. Although in the illustrated embodiment, the first and second inner panels 120a-b are acoustic walls, in several embodiments, the panels 120a-b can be other structural members that serve other purposes.

The latch 160 selectively interlocks with the catch 140 to inhibit the first and second panels 120a-b from pivoting about the pylon 116 and to ensure the panels 120a-b remain in the closed position during operation. In the illustrated embodiment, the catch 140 is attached to the inner surface 128a of the upper portion 122a of the first inner panel 120a, and the latch 160 is attached to the inner surface 128b of the upper portion 122b of the second inner panel 120b. The catch 140 and the latch 160 accordingly project inwardly into the gap $G_1$ between the first and second panels 120a-b. Although in the illustrated embodiment, the catch 140 and the latch 160 are attached to a forward portion of the first and second panels 120a-b, respectively, in other embodiments, the catch 140 and the latch 160 can be coupled to an aft portion or other section of the panels 120a-b. In additional embodiments, the catch 140 and latch 160 can be coupled to the outer surface 130a-b or another portion of the first and second inner panels 120a-b. Moreover, in other embodiments, in lieu of or in addition to the catch 140 and latch 160, other linkages or locking mechanisms can be used to inhibit the first and second panels 120a-b from moving relative to each other.

Figure 3:
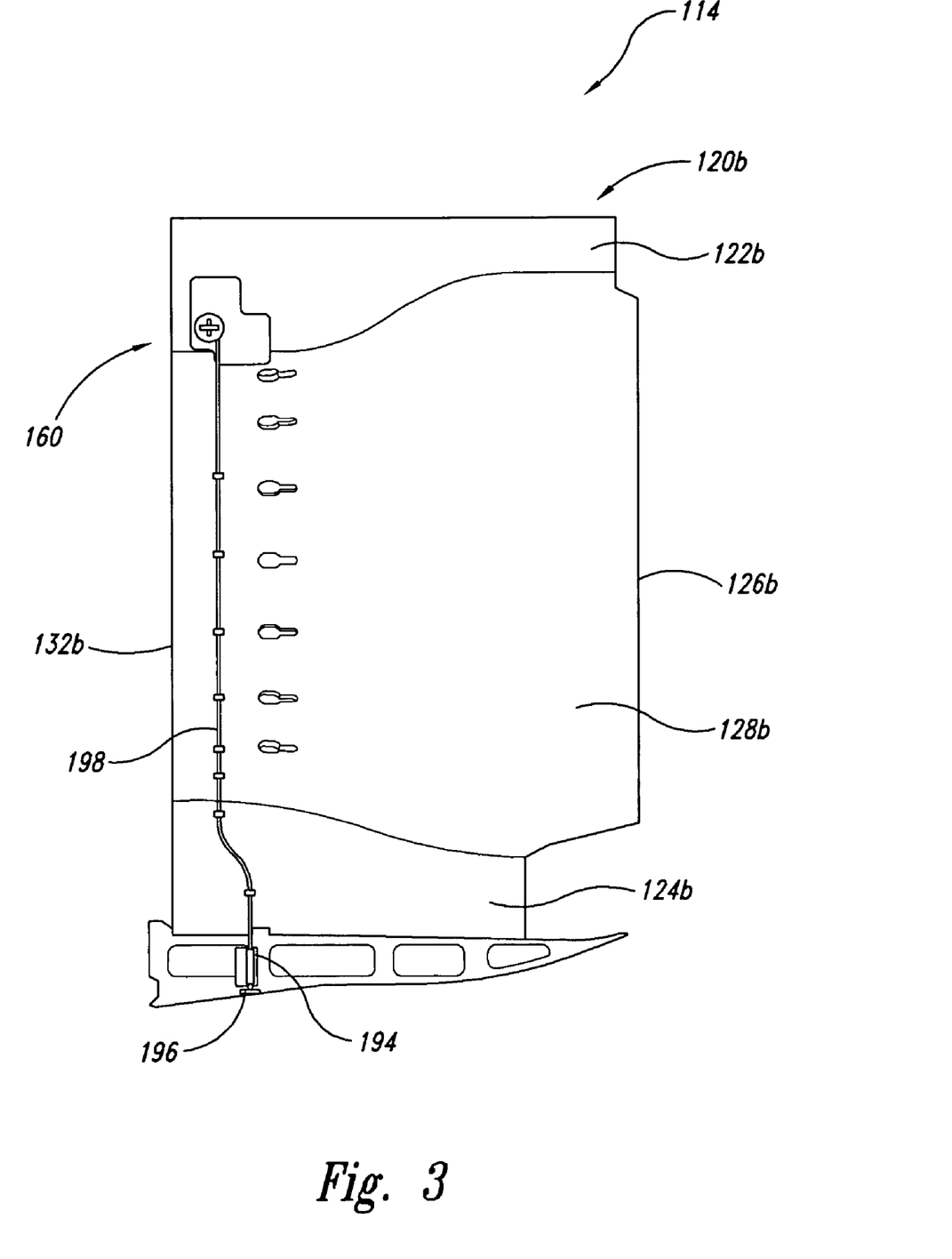
FIG. 3 is a schematic side view taken substantially along the line A-A of FIG. 2.

FIG. 3 is a schematic side view taken substantially along the line A-A of FIG. 2. The illustrated thrust reverser 114 further includes a trigger 194 attached at the lower portion 124b of the second inner panel 120b and an encased cable 198 extending between the trigger 194 and the latch 160. The trigger 194 can include a handle 196 attached to the cable 198 for selectively pushing and/or pulling the cable 198 to remotely actuate the latch 160. The second inner panel 120b can include an access door (not shown) between the trigger 194 and the outer surface 130b (FIG. 2) so that an operator can access the trigger 194. In other embodiments, in lieu of or in addition to the cable 198 and the trigger 194, the thrust reverser 114 may include an electrical, hydraulic, and/or other suitable system for remotely actuating the latch 160. Moreover, in several embodiments, the trigger 194 may be attached to another location, and/or the latch 160 may not be a remotely-actuated latch.

Figure 4:
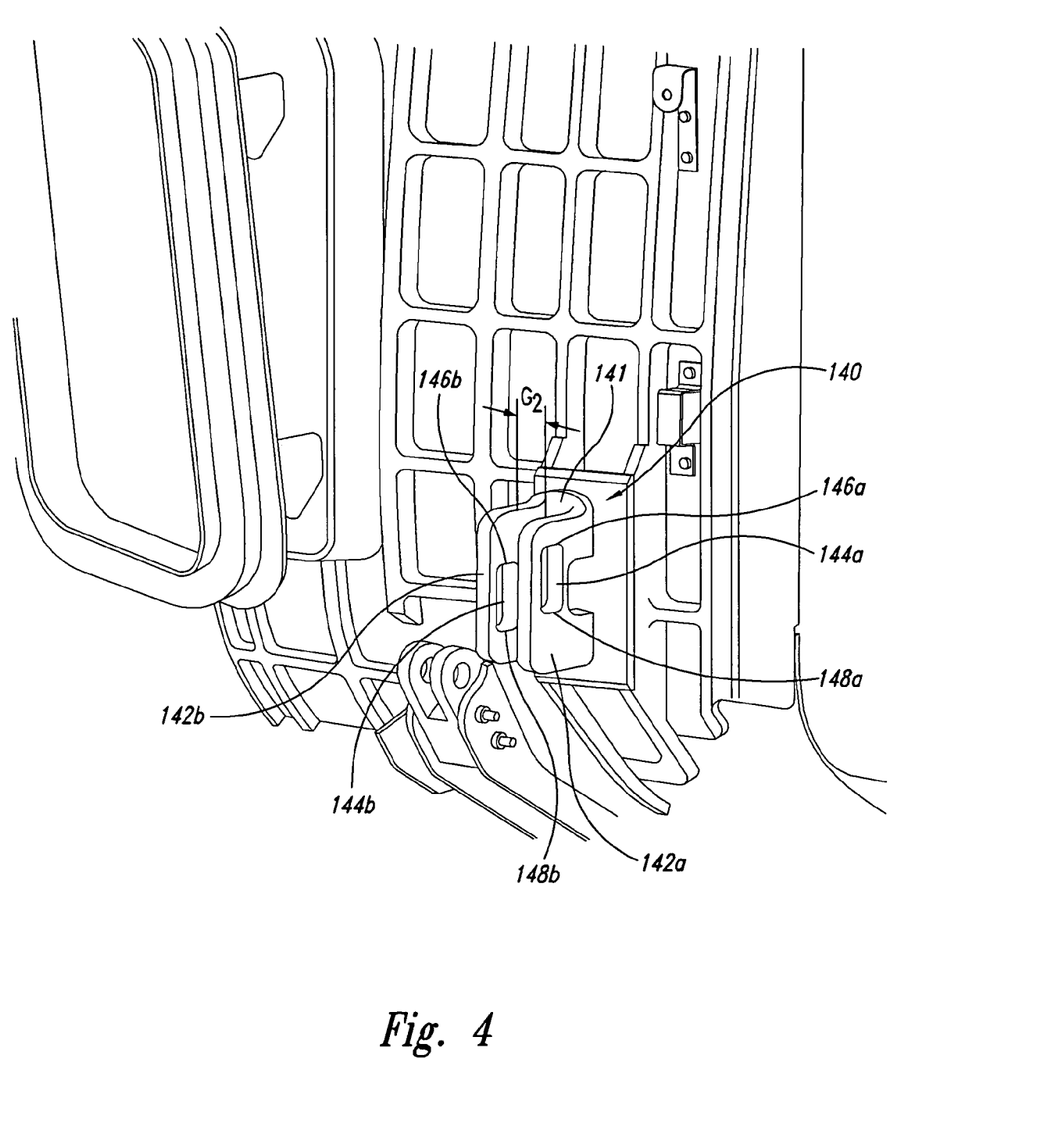
FIG. 4 is an enlarged schematic isometric view of a catch in accordance with one embodiment of the invention.

FIG. 4 is an enlarged schematic isometric view of the catch 140 in accordance with one embodiment of the invention. The illustrated catch 140 includes a base 141 attached to the inner surface 128a of the first inner panel 120a, a first member 142a projecting from the base 141, and a second member 142b projecting from the base 141. The first member 142a is generally parallel to the second member 142b, and the first and second members 142a-b are spaced apart by a gap $G_2$. The first member 142a includes a first aperture 144a, and the second member 142b includes a second aperture 144b offset downwardly from the first aperture 144a. More specifically, a first end 146a of the first aperture 144a is above a first end 146b of the second aperture 144b, and a second end 148a of the first aperture 144a is above a second end 148b of the second aperture 144b. The first and second apertures 144a-b are oriented so that an engagement member of the latch 160 (described below with reference to FIG. 5) can pivot between (a) a lock position in which the engagement member is received in the apertures 144a-b, and (b) a release position in which the engagement member is external to the apertures 144a-b. In other embodiments, the catch 140 can have other configurations. For example, the catch 140 may include only the first member 142a, and/or the apertures 144a-b may be slots or other openings.

Figure 5:
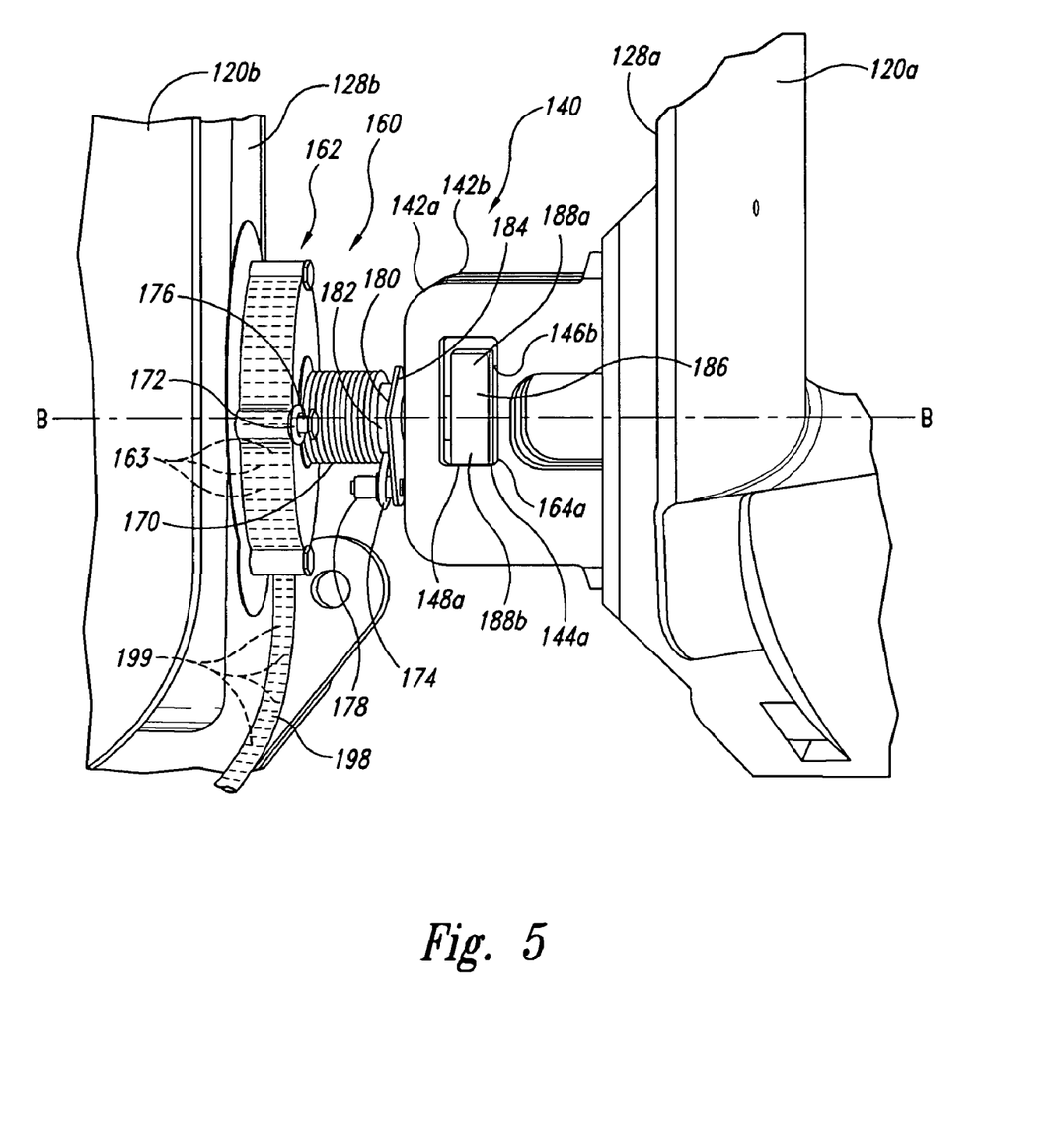
FIG. 5 is an enlarged schematic view of the catch of FIG. 4 and a latch in accordance with one embodiment of the invention.

FIG. 5 is an enlarged schematic view of the catch 140 and the latch 160 of FIG. 2. The illustrated latch 160 includes a driving mechanism 162 and an engagement member 180 coupled to the driving mechanism 162. When an operator actuates the trigger 194 (FIG. 3), the driving mechanism 162 pivots the engagement member 180 about an axis B-B between a release position (shown in FIG. 5) and a lock position (shown in FIG. 7). More specifically, the illustrated driving mechanism 162 includes a gear with teeth 163 (shown in broken lines) configured to engage corresponding teeth 199 (shown in broken lines) on the cable 198 so that linear movement of the cable 198 drives the mechanism 162, which in turn pivots the engagement member 180. Suitable driving mechanisms include Part No. 7-45880-1 manufactured by Triumph Controls Incorporated of North Wales, Pa. In additional embodiments, such as those described below with reference to FIGS. 8 and 9, the driving mechanism 162 can have other configurations to selectively move the engagement member 180.

The illustrated engagement member 180 includes a shaft 182, a flange 184 on the shaft 182, and a head 186 at a distal end of the shaft 182. The head 186 includes a first end portion 188a projecting in a first direction generally normal to the shaft 182 and a second end portion 188b projecting in a second direction generally normal to the shaft 182 and opposite the first direction. The illustrated engagement member 180 accordingly has a "T" shaped configuration. The first and second end portions 188a-b are sized to be received within the first and second apertures 144a-b of the catch 140, respectively. As such, when the driving mechanism 162 pivots the engagement member 180 about the axis B-B from the release position to the lock position, the first end portion 188a moves into the first aperture 144a and the second end portion 188b moves into the second aperture 144b. The engagement member 180 can pivot until the first end portion 188a contacts the second end 148a of the first aperture 144a and the second end portion 188b contacts the first end 146b of the second aperture 144b.

The latch 160 further includes a resilient member or torsional spring 170 carried by the section of the shaft 182 between the driving mechanism 162 and the flange 184. The spring 170 includes a first end 172 attached to the driving mechanism 162 with a first pin 176 and a second end 174 attached to the flange 184 of the engagement member 180 with a second pin 178. The spring 170 is configured to exert a torsional force on the engagement member 180 and urge the member 180 toward the lock position. As such, the spring 170 prevents the latch 160 from inadvertently becoming unlocked during operation of the aircraft.

Figure 6:
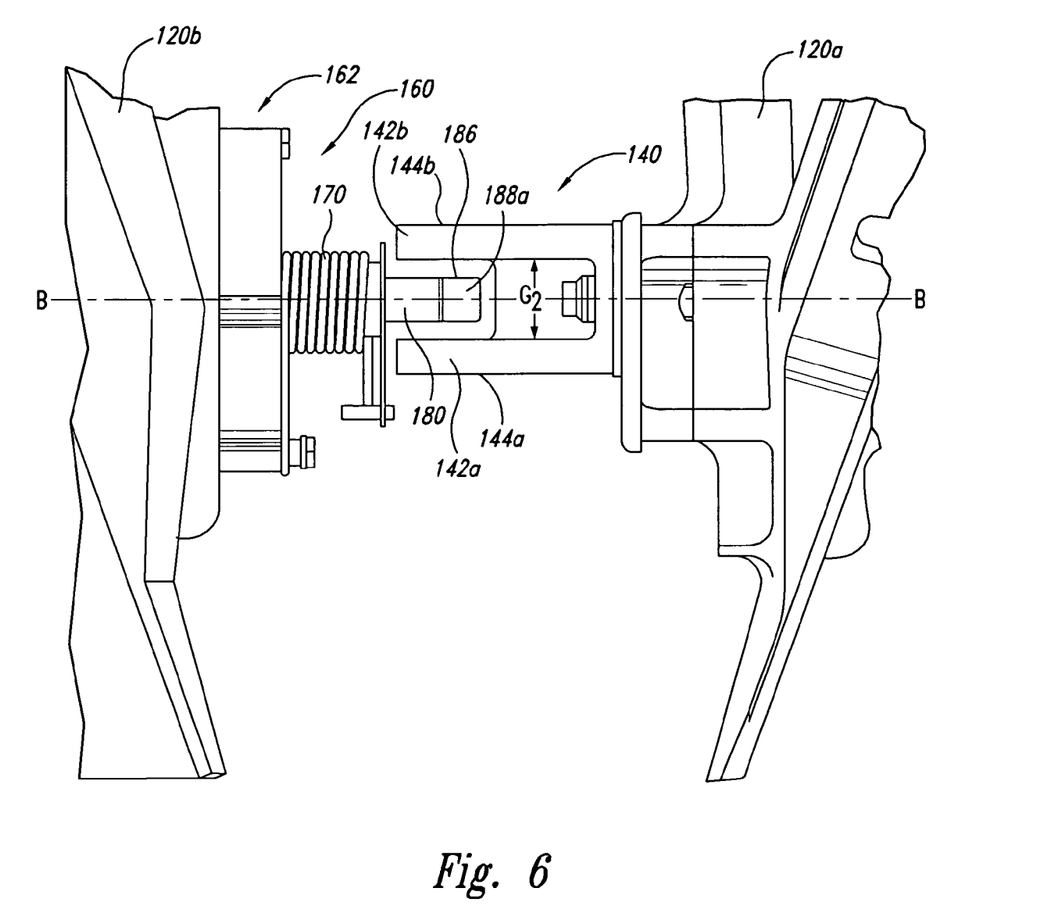
FIG. 6 is a schematic top plan view of the catch and the latch of FIG. 5 with the latch in the release position.

FIG. 6 is a schematic top plan view of the catch 140 and the latch 160 of FIG. 5. In the release position, the head 186 of the engagement member 180 is positioned in the gap $G_2$ between the first member 142a and the second member 142b of the catch 140 such that the first and second end portions 188a and 188b (FIG. 4) are external to the first and second apertures 144a-b. When the latch 160 is in the release position, the first and second inner panels 120a-b can move relative to each other and pivot to the open position so that an operator can access the engine and/or thrust reverser for repair or maintenance.

Figure 7:
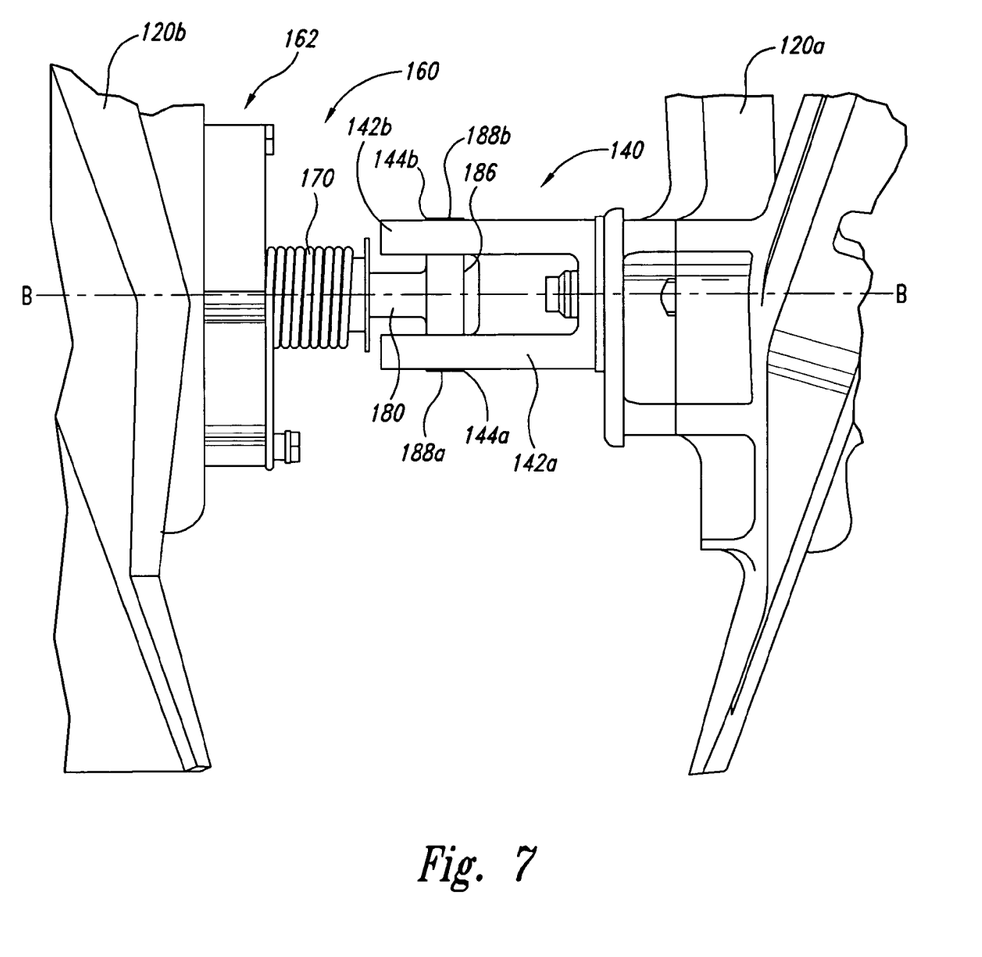
FIG. 7 is a schematic top plan view of the catch and the latch of FIG. 5 with the latch in the lock position.

FIG. 7 is a schematic top plan view of the catch 140 and the latch 160 with the latch 160 in the lock position. In response to an operator's input (e.g., pushing on the handle 196 (FIG. 3)), the driving mechanism 162 pivots the engagement member 180 about the axis B-B approximately 90 degrees from the release position to the lock position. In the lock position, the first end portion 188a is received in the first aperture 144a of the catch 140, and the second end portion 188b is received in the second aperture 142b of the catch 140. As such, the interlocked latch 160 and catch 140 inhibit the first and second panels 120a-b from moving relative to each other and pivoting to the open position.

One feature of an embodiment of the thrust reverser 114 illustrated in FIGS. 2-7 is that the interlocked catch 140 and latch 160 increase the stiffness of the first and second inner panels 120a-b. An advantage of this feature is that the increased stiffness reduces the deflection of the first and second inner panels 120a-b during operation. Accordingly, an aircraft may include a high-thrust engine without causing excessive deflection in the thrust reverser 114 due to the increased loads. Excessive deflection of the first and second inner panels 120a-b significantly changes the load path through the thrust reverser 114 and can damage components. Moreover, the interlocked catch 140 and latch 160 provide hoop continuity at the first and second inner panels 120a-b such that the forward edges 132a-b do not deflect significantly and remain in the V-groove of the fan casing during operation.

Another feature of the thrust reverser 114 illustrated in FIGS. 2-7 is that the latch 160 is remotely actuated by the trigger 194 located at the lower portion 124b of the second inner panel 120b. An advantage of this feature is that the trigger 194 is positioned at a convenient and accessible location at a lower portion of the thrust reverser 114 to facilitate actuation of the latch 160.

B. Additional Embodiments of Latching Mechanisms For Use on Thrust Reversers

Figure 8:
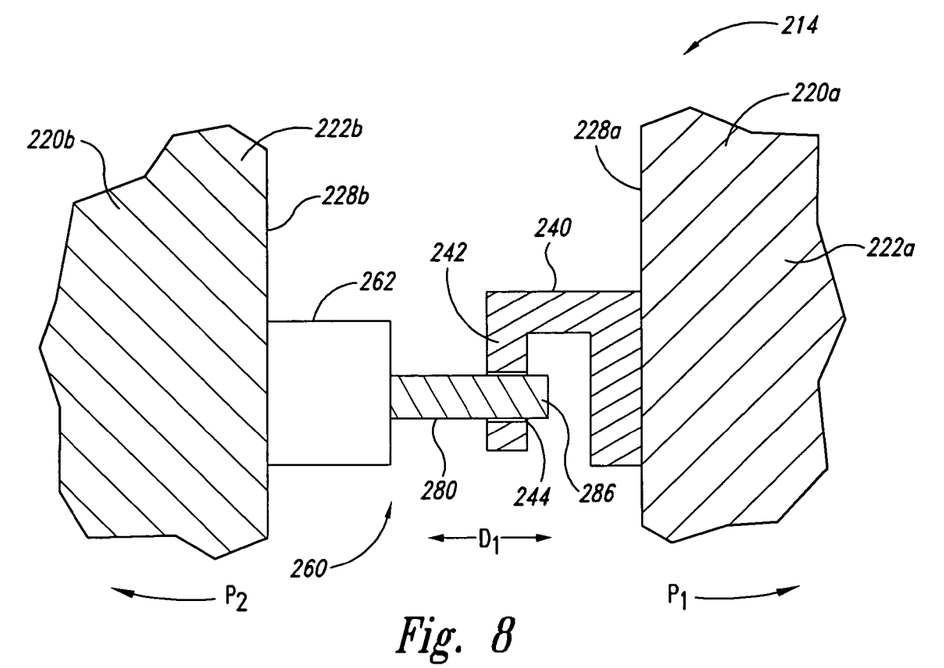
FIG. 8 is a schematic front cross-sectional view of a portion of a thrust reverser in accordance with another embodiment of the invention.

FIG. 8 is a schematic front cross-sectional view of a portion of a thrust reverser 214 in accordance with another embodiment of the invention. The illustrated thrust reverser 214 is generally similar to the thrust reverser 114 described above with reference to FIGS. 2-7. For example, the illustrated thrust reverser 214 includes a first inner panel 220a, a second inner panel 220b opposite the first panel 220a, a catch 240 attached to an inner surface 228a of an upper portion 222a of the first panel 220a, and a latch 260 attached to an inner surface 228b of an upper portion 222b of the second panel 220b. The illustrated catch 240, however, includes a plate having a section 242 spaced apart from the inner surface 228a. The section 242 has an aperture 244 sized and aligned to receive a portion of the latch 260.

The illustrated latch 260 includes a solenoid 262 (shown schematically) and a pin 280 coupled to the solenoid 262. The solenoid 262 selectively moves the pin 280 in a direction $D_1$ between (a) a lock position (shown in FIG. 8) in which a distal portion 286 of the pin 280 is received in the aperture 244 of the catch 240, and (b) a release position (not shown) in which the distal portion 286 of the pin 280 is external to the aperture 244 of the catch 240. In the lock position, the interlocked latch 260 and catch 240 inhibit the first and second inner panels 220a-b from pivoting in the directions $P_1$ and $P_2$, respectively, to the open position. In other embodiments, the catch 240 and/or the latch 260 can have other configurations. For example, the pin 280 can be driven by hydraulic power or another power source.

Figure 9:
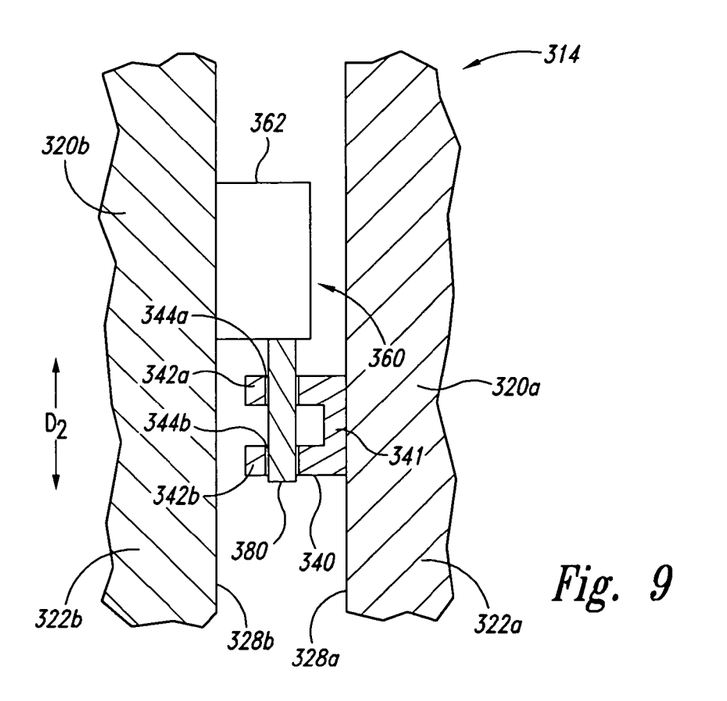
FIG. 9 is a schematic front cross-sectional view of a portion of a thrust reverser in accordance with another embodiment of the invention.

FIG. 9 is a schematic front cross-sectional view of a portion of a thrust reverser 314 in accordance with another embodiment of the invention. The illustrated thrust reverser 314 is generally similar to the thrust reverser 114 described above with reference to FIGS. 2-7. For example, the illustrated thrust reverser 314 includes a first inner panel 320a, a second inner panel 320b opposite the first panel 320a, a catch 340 attached to an inner surface 328a of an upper portion 322a of the first panel 320a, and a latch 360 attached to an inner surface 328b of an upper portion 322b of the second panel 320b. The illustrated catch 340, however, includes a base 341, a first member 342a projecting from the base 341, and a second member 342b projecting from the base 341 and spaced apart from the first member 342a. The first member 342a includes a first aperture 344a, and the second member 342b includes a second aperture 344b aligned with the first aperture 344a.

The illustrated latch 360 includes a solenoid 362 (shown schematically) and a pin 380 coupled to the solenoid 362. The solenoid 362 selectively moves the pin 380 in a direction $D_2$ between (a) a lock position in which the pin 380 is received in the first and second apertures 344a-b, and (b) a release position in which the pin 380 is external to the apertures 344a-b. In the lock position, the interlocked latch 360 and catch 340 inhibit the first and second inner panels 320a-b from pivoting in the directions $P_1$ and $P_2$, respectively, to the open position.

From the foregoing, it will be appreciated that specific embodiments of the invention have been described herein for purposes of illustration, but that various modifications may be made without deviating from the spirit and scope of the invention. For example, many of the features of one embodiment can be combined with other embodiments in addition to or in lieu of the features of the other embodiments. Accordingly, the invention is not limited except as by the appended claims.

We claim:

1. An aircraft system, comprising:
   a thrust reverser including a first inner panel and a second inner panel opposite the first inner panel, the first and second inner panels having an inner surface and an upper portion;
   a catch projecting inwardly from the inner surface and the upper portion of the first inner panel, wherein the catch includes a first member with a first aperture and a second member with a second aperture, the first member being spaced apart from and generally parallel to the second member;
   a latch projecting inwardly from the inner surface and the upper portion of the second inner panel, the latch positioned to selectively interlock with the catch to inhibit relative movement between the first and second inner panels, wherein the latch is a remotely-actuated latch having a driving mechanism and an engagement member coupled to the driving mechanism, the engagement member having a first end portion and a second end portion; and
   the driving mechanism is configured to move the engagement member between (a) a lock position in which the first end portion is received at least partially in the first aperture and the second end portion is received at least partially in the second aperture, and (b) a release position in which the first end portion is external to the first aperture and the second end portion is external to the second aperture.

2. The aircraft system of claim 1 wherein the engagement member rotates between the lock position and the release position.

3. The aircraft system of claim 1 wherein the engagement member has a "T" shaped configuration.

4. The aircraft system of claim 1 wherein the first and second inner panels further include a lower portion and an arcuate portion between the upper and lower portions.

5. The aircraft system of claim 1 wherein:
   the first and second inner panels further include a lower portion and an arcuate portion between the upper and lower portions; and
   the system further comprises a trigger at least proximate to the lower portion of the second inner panel and an actuator coupling the trigger to the latch.

6. The aircraft system of claim 1, further comprising a support member;
   wherein the upper portion of the first inner panel is pivotably coupled to the support member;
   wherein the upper portion of the second inner panel is pivotably coupled to the support member; and
   wherein the first and second inner panels are inhibited from moving relative to the support member when the latch interlocks with the catch.

7. The aircraft system of claim 1 wherein:
   the first and second inner panels further include a forward portion and an aft portion opposite the forward portion; and
   the catch is attached to the forward portion of the first inner panel and the latch is attached to the forward portion of the second inner panel.

8. The aircraft system of claim 1 wherein:
   the first and second inner panels further include a forward portion and an aft portion opposite the forward portion; and
   the catch is attached to the aft portion of the first inner panel and the latch is attached to the aft portion of the second inner panel.

9. The aircraft system of claim 1 wherein:
   the upper portion of the first inner panel is spaced apart from the upper portion of the second inner panel by a gap; and
   the latch and the catch project into the gap.

10. The aircraft system of claim 1 further comprising:
    a wing coupled to the thrust reverser;
    a fuselage attached to the wing; and
    a tail coupled to the fuselage.

11. An aircraft system, comprising:
    a support member;
    a thrust reverser including a first inner wall and a second inner wall opposite the first inner wall, the first inner wall having an inner surface and an upper portion pivotably attached to the support member, the second inner wall having an inner surface and an upper portion pivotably attached to the support member, wherein the first and second inner walls form a barrel through which engine gases pass during operation, and wherein the upper portion of the first inner wall is spaced apart from the upper portion of the second inner wall by a gap;
    a catch projecting inwardly from the inner surface of the upper portion of the first inner wall into the gap, the catch having an opening; and
    a latch projecting inwardly from the inner surface of the upper portion of the second inner wall into the gap, the latch including an engagement member movable between (a) a lock position in which the engagement member is at least partially received in the opening of the catch to inhibit the first and second inner walls from pivoting relative to the support member, and (b) a release position in which the engagement member is external to the opening of the catch.

12. The aircraft system of claim 11 wherein the latch further includes (a) a driving mechanism to move the engagement member between the lock and release positions, and (b) a resilient member to urge the engagement member to move in a direction.

13. The aircraft system of claim 11 wherein the engagement member pivots between the lock position and the release position.

14. The aircraft system of claim 11 wherein the engagement member moves linearly between the lock position and the release position.

15. The aircraft system of claim 11 wherein the latch is a remotely-actuated latch.

16. The aircraft system of claim 11 wherein the first and second inner walls further include a lower portion and an arcuate portion between the upper and lower portions.

17. An aircraft system, comprising:
a thrust reverser including first and second inner panels each movable between an open position and a closed position, the first and second inner panels having an inner surface and a forward portion, wherein the first and second inner panels form a barrel through which engine gases pass during operation, and wherein at least a segment of the forward portion of the first inner panel is spaced apart from at least a segment of the forward portion of the second inner panel by a gap;
a catch projecting inwardly from the inner surface of the forward portion of the first inner panel into the gap; and
a remotely-actuated latch projecting inwardly from the inner surface of the forward portion of the second inner panel into the gap, the latch having (a) an engagement member to selectively engage the catch to retain the first and second inner panels in the closed position, and (b) a driver to move the engagement member.

18. The aircraft system of claim 17 wherein:
the first and second inner panels further include an upper portion, a lower portion, and an arcuate portion between the upper and lower portions;
the catch is coupled to the upper portion of the first inner panel; and
the latch is coupled to the upper portion of the second inner panel.

19. The aircraft system of claim 17 wherein:
the catch includes an aperture; and
the engagement member is movable between (a) a lock position in which the engagement member is at least partially received in the aperture of the catch, and (b) a release position in which the engagement member is external to the aperture of the catch.

20. The aircraft system of claim 17 wherein the driver includes a solenoid.

21. An aircraft system, comprising:
a thrust reverser including a first inner panel and a second inner panel opposite the first inner panel, the first and second inner panels having an upper portion, a lower portion, and an arcuate portion between the upper and lower portions, wherein the first and second inner panels form a barrel through which engine gases pass during operation, and wherein the upper portion of the first panel is spaced apart from the upper portion of the second panel by a gap;
a receiving member projecting inwardly from the upper portion of the first inner panel into the gap; and
an engagement member projecting inwardly from the upper portion of the second inner panel into the gap, the engagement member being selectively movable between (a) a lock position in which the engagement member interlocks with the receiving member to inhibit relative movement between the first and second panels, and (b) a release position in which the engagement member does not inhibit the first and second panels from moving relative to each other.

22. The aircraft system of claim 21 wherein:
the first and second inner panels further include an inner surface;
the receiving member is coupled to the inner surface of the first inner panel; and
the engagement member is operably coupled to the inner surface of the second inner panel.

23. An aircraft system, comprising:
a thrust reverser including a first inner panel and a second inner panel opposite the first inner panel, the first and second inner panels having an inner surface and an upper portion, wherein at least one of the first and second inner panels is movable relative to the other and wherein the first and second inner panels form a barrel through which engine gases pass during operation, and wherein the upper portion of the first inner panel is spaced apart from the upper portion of the second inner panel by a gap; and
means for selectively inhibiting the first and second panels from moving relative to each other, wherein the means for selectively inhibiting the first and second panels include a catch attached to the first inner panel and a latch attached to the second inner panel, the means for inhibiting projecting inwardly from the inner surface and the upper portion of the first and second inner panels into the gap.

24. The aircraft system of claim 23 wherein the means for selectively inhibiting the first and second panels includes a plate with an aperture and an engagement member sized to be at least partially received in the aperture.

25. The aircraft system of claim 23 wherein the means for selectively inhibiting the first and second panels includes a remotely-actuated latch.

26. An aircraft system, comprising:
a thrust reverser including a first inner panel and a second inner panel opposite the first inner panel, the first and second inner panels having an upper portion, wherein at least one of the first and second inner panels is movable relative to the other and wherein the first and second inner panels form a barrel through which engine gases pass during operation, and wherein the upper portion of the first inner panel is spaced a part from the upper portion of the second inner panel by a gap; and
a locking mechanism coupled to the first and second inner panels to selectively inhibit the first and second panels from moving relative to each other, wherein the locking mechanism includes a latch projecting inwardly into the gap from inner surface of the upper portion of the first inner panel and a catch projecting inwardly into the gap from the inner surface of the supper portion of the second inner panel.

27. A method for manufacturing a thrust reverser on an aircraft, the thrust reverser having a first inner panel and a second inner panel, wherein the first and second inner panels form a barrel through which engine gases pass during operation, and wherein an upper portion of the first inner panel is spaced apart from an upper portion of the second inner panel by a gap, the method comprising:
coupling a catch to an inner surface of an upper portion of the first inner panel such that the catch projects from the first inner panel into the gap; and
attaching a latch to an inner surface of an upper portion of the second inner panel such that the latch projects from the second panel into the gap and is positioned to selectively interlock with the catch to inhibit relative movement between the first and second inner panels.

28. The method of claim 27 wherein:
coupling the catch includes attaching a plate to the first inner panel, the plate having an opening; and
attaching the latch includes coupling an engagement member to the second inner panel, the engagement member having a distal portion sized to be at least partially received within the opening.

29. The method of claim 27 wherein:
coupling the catch includes attaching a plate to the first inner panel, the plate having an opening; and
attaching the latch includes coupling an engagement member and a driving mechanism to the second inner panel such that the driving mechanism is positioned to move the engagement member between (a) a lock position in which the engagement member is at least partially received in the opening of the plate, and (b) a release position in which the engagement member is external to the opening.

30. The method of claim 27 wherein attaching the latch includes coupling a remotely-actuated latch to the second inner panel.

31. The method of claim 27 wherein:
coupling the catch includes attaching the catch to a forward portion of the first inner panel; and
attaching the latch includes coupling the latch to a forward portion of the second inner panel.

32. The method of claim 27, further comprising:
pivotably coupling the first inner panel to a support member; and
pivotably coupling the second inner panel to the support member.

33. The method of claim 27, further comprising:
attaching a trigger to a lower portion of the second inner panel; and
positioning an actuator between the trigger and the latch to actuate the latch to interlock with the catch.

34. The method of claim 27 wherein the first and second inner panels further include a lower portion and an arcuate portion between the upper and lower portions.

35. A method for operating a latching mechanism on a thrust reverser of an aircraft, the thrust reverser having a first inner panel and a second inner panel forming a barrel through which engine gases pass during operation, wherein the latching mechanism projects into a gap between inner upper portions of the first and second inner panels, the method comprising:
remotely actuating a latch to move an engagement member of the latch from (a) a lock position in which the engagement member is interlocked with a catch such that the latch and catch inhibit relative motion between the first and second inner panels, to (b) a release position in which the latch and catch do not inhibit relative movement between the first and second inner panels, wherein the catch projects inwardly from an inner surface of an upper portion of the first inner panel and the latch projects inwardly from an inner surface of an upper portion of the second inner panel; and
moving at least one of the first and second inner panels relative to the other.

36. The method of claim 35 wherein remotely actuating the latch comprises actuating a trigger at a lower portion of the second inner panel.

* * * * *